United States Patent
Muthiah et al.

(10) Patent No.: US 12,299,367 B2
(45) Date of Patent: May 13, 2025

(54) SYSTEM AND METHOD FOR GENERATING ENCAPSULATED ERROR SIGNATURE DURING FUNCTIONAL SIMULATION

(71) Applicant: HCL America Inc., Sunnyvale, CA (US)

(72) Inventors: Manickam Muthiah, Shrewsbury, MA (US); Razi Abdul Rahim, Willowbrook, IL (US)

(73) Assignee: HCL America Inc.

( * ) Notice: Subject to any disclaimer, the term of this patent is extended or adjusted under 35 U.S.C. 154(b) by 504 days.

(21) Appl. No.: 17/851,220

(22) Filed: Jun. 28, 2022

(65) Prior Publication Data

US 2023/0419007 A1 Dec. 28, 2023

(51) Int. Cl.
| | |
|---|---|
| G06F 30/33 | (2020.01) |
| G06F 30/3308 | (2020.01) |
| G06F 113/18 | (2020.01) |
| G06F 115/02 | (2020.01) |
| G06F 119/02 | (2020.01) |

(52) U.S. Cl.
CPC ...... *G06F 30/3308* (2020.01); *G06F 2113/18* (2020.01); *G06F 2115/02* (2020.01); *G06F 2119/02* (2020.01)

(58) Field of Classification Search
USPC .................. 716/101, 103, 104, 106
See application file for complete search history.

(56) References Cited

U.S. PATENT DOCUMENTS

| | | | |
|---|---|---|---|
| 6,311,311 B1 * | 10/2001 | Swaney | G06F 11/27 714/724 |
| 7,281,222 B1 * | 10/2007 | Babcock | G06F 30/39 716/53 |
| 7,620,853 B1 * | 11/2009 | Kasnavi | G11C 29/02 714/719 |
| 8,209,658 B2 | 6/2012 | Mostow | |
| 9,442,832 B2 | 9/2016 | Bharara | |
| 10,338,993 B1 | 7/2019 | Lekivetz et al. | |
| 10,409,663 B2 | 9/2019 | Sampei et al. | |
| 10,997,010 B2 | 5/2021 | Ranganathan et al. | |
| 2020/0004617 A1 | 1/2020 | Handa et al. | |

FOREIGN PATENT DOCUMENTS

| | | |
|---|---|---|
| CN | 107450346 A | 12/2017 |
| DE | 102012102770 A1 | 11/2012 |

* cited by examiner

*Primary Examiner* — Brian Ngo
(74) *Attorney, Agent, or Firm* — Kendal M. Sheets

(57) ABSTRACT

This disclosure relates to system and method for generating an encapsulated error signature during functional simulation. The method includes receiving at least one error descriptor notification message from at least one of a plurality of testbench components. Each of the at least one error descriptor notification message includes values corresponding to a plurality of error attributes including error ranking, error code, error message, and error score. The method further includes iteratively updating in real-time, a plurality of arrays based on values corresponding to one or more of the plurality of error attributes, in response to receiving each of the at least one error descriptor notification message. The method further includes iteratively generating in real-time, an encapsulated error signature based on each of the error ranking, the error code, and an error count associated with the error code derived from one or more of the plurality of arrays.

20 Claims, 6 Drawing Sheets

Encapsulated Error Signature 602:

1_REGRDTIMEOUT:1_REGWRTIMEOUT:1_#2_OUTPKTPYLDMISMATCH:1

Consolidated Error Score 604:
44

First Error Observed 606:
OUTPKTPYLDMISMATCH

Number of Different Errors Observed 608:
3

Error Code Look-Up Table 610:

| Error Code 612 | Error Message 614 |
|---|---|
| REGRDTIMEOUT | Register Read Transaction Timed Out |
| REGWRTIMEOUT | Register Write Transaction Timed Out |
| OUTPKTPYLDMISMATCH | Expected vs. Actual Output Packet Payload Mismatch |

FIG. 6

SYSTEM AND METHOD FOR GENERATING ENCAPSULATED ERROR SIGNATURE DURING FUNCTIONAL SIMULATION

TECHNICAL FIELD

This disclosure relates generally to functional simulation error management, and more particularly to system and method for generating an encapsulated error signature during pre-silicon functional simulation.

BACKGROUND

Pre-Silicon Testing of a Device Under Test (DUT) or a System Under Test (SUT) includes identifying errors which may potentially occur when the pre-silicon functional simulations are run. In many situations, multiple errors may occur in a simulation run. For example, when a regression involving a large number of tests is run, there may be multiple test/simulation failures. Addressing the test failures one by one, going through log files generated for the failed simulations and grouping the test failures based on error messages printed in the log files may be time-consuming and tedious.

In the present state of art, a standard mechanism for triaging/grouping the simulation failures from a regression based on the errors seen in each of the failing simulations does not exist. Moreover, conventional techniques fail to provide for grouping similar test failures automatically. There is, therefore, a need in the present state of art for techniques to automatically generate a consolidated error signature for each of the simulation failures in real-time.

SUMMARY

In one embodiment, a method for generating an encapsulated error signature during functional simulation is disclosed. In one example, the method includes receiving at least one error descriptor notification message from at least one of a plurality of testbench components in a test environment. Each of the at least one error descriptor notification message includes values corresponding to a plurality of error attributes including an error ranking, an error code, an error message, and an error score. The method further includes iteratively updating in real-time, a plurality of arrays based on values corresponding to one or more of the plurality of error attributes, in response to receiving each of the at least one error descriptor notification message. The method further includes iteratively generating in real-time, an encapsulated error signature based on each of the error ranking, the error code, and an error count associated with the error code derived from one or more of the plurality of arrays. Generating the encapsulated error signature includes creating a plurality of error clusters in the encapsulated error signature. Each error cluster includes at least one error code with the same error ranking. Each of the at least one error code is appended with the associated error count.

In one embodiment, a system for generating an encapsulated error signature during functional simulation is disclosed. In one example, the system includes a processor and a computer-readable medium communicatively coupled to the processor. The computer-readable medium stores processor-executable instructions, which, on execution, cause the processor to receive at least one error descriptor notification message from at least one of a plurality of testbench components. Each of the at least one error descriptor notification message includes values corresponding to a plurality of error attributes including an error ranking, an error code, an error message, and an error score. The processor-executable instructions, on execution, further cause the processor to iteratively update in real-time, a plurality of arrays based on values corresponding to one or more of the plurality of error attributes, in response to receiving each of the at least one error descriptor notification message. The processor-executable instructions, on execution, further cause the processor to iteratively generate in real-time, an encapsulated error signature based on each of the error ranking, the error code, and an error count associated with the error code derived from one or more of the plurality of arrays. Generating the encapsulated error signature includes creating a plurality of error clusters in the encapsulated error signature. Each error cluster includes at least one error code with the same error ranking. Each of the at least one error code is appended with the associated error count.

In one embodiment, an error signature encapsulator for generating an encapsulated error signature during functional simulation is disclosed. In one example, the error signature encapsulator is configured for receiving at least one error descriptor notification message from at least one of a plurality of testbench components. Each of the at least one error descriptor notification message includes values corresponding to a plurality of error attributes including an error ranking, an error code, an error message, and an error score. The error signature encapsulator is further configured for iteratively updating in real-time, a plurality of arrays based on values corresponding to one or more of the plurality of error attributes, in response to receiving each of the at least one error descriptor notification message. The error signature encapsulator is further configured for iteratively generating in real-time, an encapsulated error signature based on each of the error ranking, the error code, and an error count associated with the error code derived from one or more of the plurality of arrays. Generating the encapsulated error signature includes creating a plurality of error clusters in the encapsulated error signature. Each error cluster includes at least one error code with the same error ranking. Each of the at least one error code is appended with the associated error count.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 illustrates an exemplary encapsulated error signature log, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
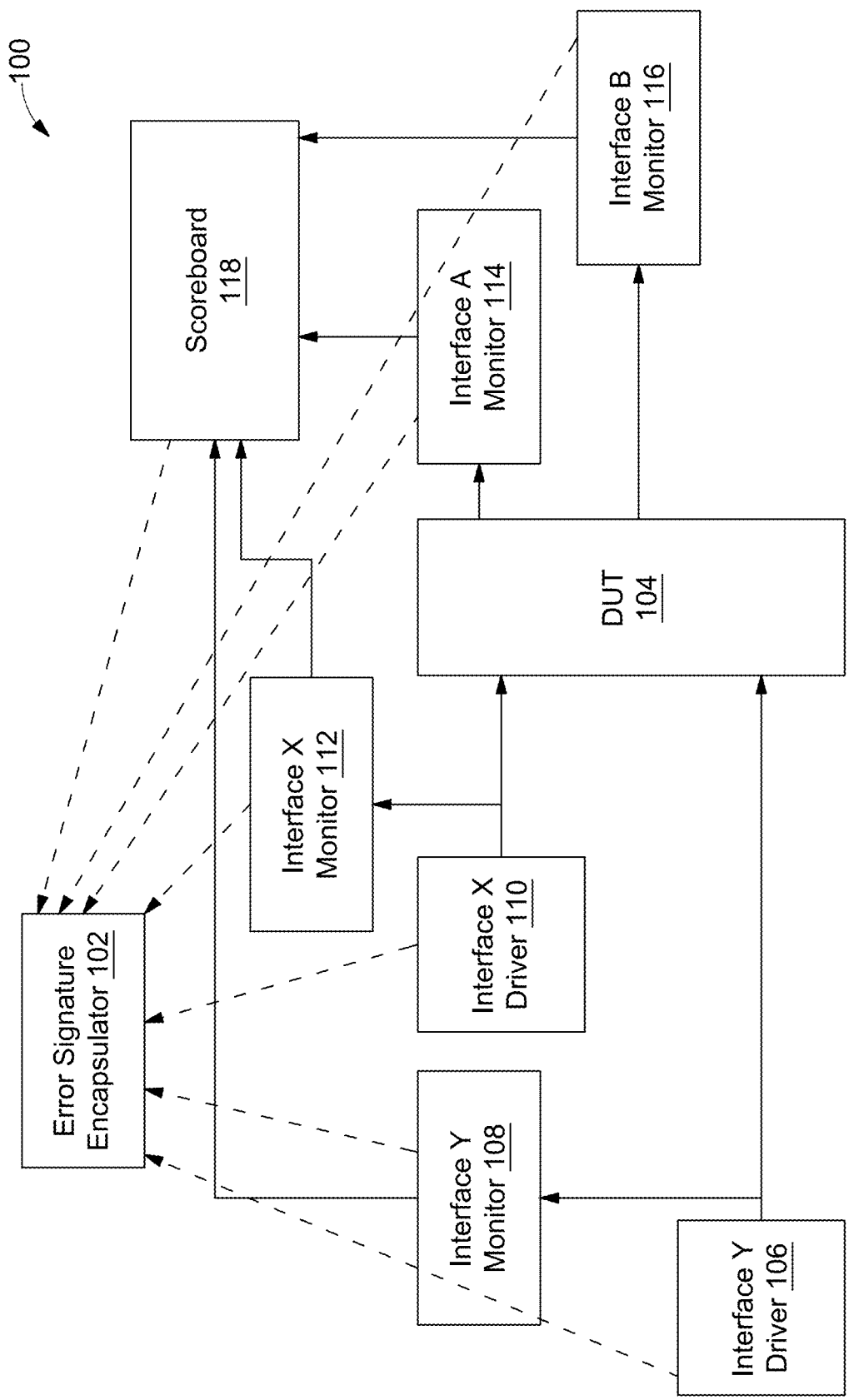
FIG. 1 is a block diagram of an exemplary test environment for generating an encapsulated error signature during functional simulation, in accordance with some embodiments.

Referring now to FIG. 1, an exemplary test environment 100 for generating an encapsulated error signature during functional simulation is illustrated, in accordance with some embodiments. The test environment 100 may implement an error signature encapsulator 102 (for example, via server, desktop, laptop, notebook, netbook, tablet, smartphone, mobile phone, or any other computing device), in accordance with some embodiments of the present disclosure. Further, for a Device Under Test (DUT) 104, the test environment 100 may further include a plurality of testbench components such as, interface Y driver 106, an associated interface Y monitor 108, interface X driver 110, an associated interface X monitor 112, interface A monitor 114, interface B monitor 116, and a scoreboard 118. The plurality of testbench components may interact with the DUT 104. Further, the error signature encapsulator 102 may receive error descriptor messages including error ranking, error code, and an error count associated with the error code received from the plurality of testbench components in the test environment 100. Further, the error signature encapsulator 102 may generate an encapsulated error signature during functional simulation based on each of error ranking, error code, and an error count associated with the error code received from the plurality of testbench components in the test environment 100.

As will be described in greater detail in conjunction with FIGS. 2-6, the error signature encapsulator 102 receives at least one error descriptor notification message from at least one of a plurality of testbench components. Each of the at least one error descriptor notification message includes values corresponding to a plurality of error attributes including an error ranking, an error code, an error message, and an error score. The error signature encapsulator 102 further iteratively updates in real-time, a plurality of arrays based on values corresponding to one or more of the plurality of error attributes, in response to receiving each of the at least one error descriptor notification message. The error signature encapsulator 102 further iteratively generates in real-time, an encapsulated error signature based on each of the error ranking, the error code, and an error count associated with the error code derived from one or more of the plurality of arrays. Generating the encapsulated error signature includes creating a plurality of error clusters in the encapsulated error signature. Each error cluster includes at least one error code with the same error ranking. Each of the at least one error code is appended with the associated error count.

In some embodiments, the encapsulated error signature generating device 102 may include one or more processors and a computer-readable medium (for example, a memory). The computer-readable medium may store instructions that, when executed by the one or more processors, cause the one or more processors to generate an encapsulated error signature during functional simulation, in accordance with aspects of the present disclosure. The computer-readable medium may also store various data (for example, error descriptor notification messages, error ranking, error count, error code, and the like) that may be captured, processed, and/or required by the test environment 100.

Figure 2:
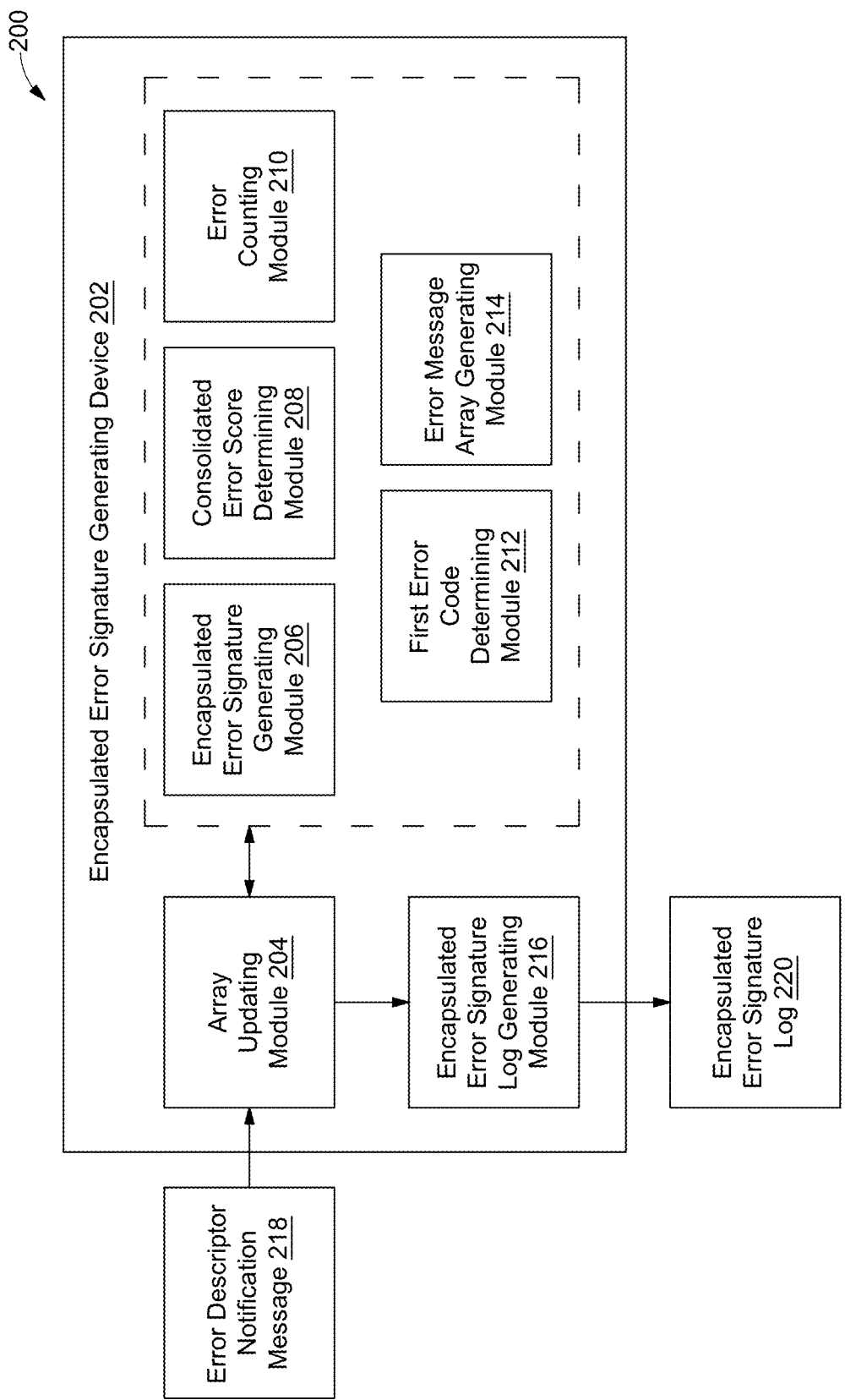
FIG. 2 illustrates a functional block diagram of an exemplary system for generating an encapsulated error signature during functional simulation, in accordance with some embodiments.

Referring now to FIG. 2, functional block diagram of an exemplary system 200 for generating an encapsulated error signature during functional simulation is illustrated, in accordance with some embodiments. The system 200 includes an encapsulated error signature generating device 202. In an embodiment, the encapsulated error signature generating device 202 is analogous to the encapsulated error signature generating device 102 of the test environment 100. The encapsulated error signature generating device 202 includes an array updating module 204, an encapsulated error signature generating module 206, a consolidated error score determining module 208, an error counting module 210, a first error code determining module 212, an error message array generating module 214, and an encapsulated error signature log generating module 216.

The array updating module 204 receives an error descriptor notification message 218 from at least one of a plurality of testbench components (for example, driver, monitor, Scoreboard, Checker, and the like). The error descriptor notification message 218 incudes values corresponding to a plurality of error attributes such as, an error ranking, an error code, an error message, and an error score. For the error descriptor notification message 218, the error ranking corresponds to a priority of handling an error, the error code is a predefined text that corresponds to the error, the error message describes the error, and the error score corresponds to a weightage given to the error within an error ranking group. By way of an example, such errors include, but are not limited to, different types of data mismatches, protocol violations, timeouts, unexpected interrupts, etc.

In some embodiments, a static method may be used for receiving notification messages (such as, the error descriptor notification message 218) from the testbench components in a test environment when an error is identified during a pre-silicon functional simulation. When an error occurs during a simulation, an error notification message is sent to the encapsulated error signature generating device 202 by an appropriate testbench component before the error is flagged. By way of an example, in a UVM Verification Environment, the error notification message is sent to the encapsulated error signature generating device 202 before uvm_error macro call, before uvm_fatal macro call, etc.

Further, the array updating module 204 iteratively updates in real-time, a plurality of arrays based on values corresponding to one or more of the plurality of error attributes, in response to receiving the error descriptor notification message 218. It should be noted that each of a subset of arrays from the plurality of arrays includes a counter. Further, to iteratively update the plurality of arrays, the array updating module 204 increments, at each iteration, the counter for one or more of the set of arrays in response to receiving the error descriptor notification message 218, based on the values corresponding to one or more of the plurality of error attributes.

In some embodiments, the plurality of arrays includes associative arrays such as, string first_err_code, bit err_seen_arr [int][string] (where first dimension is the error ranking which is an integer and second dimension is the error code which is a string), string err_msg_arr [int][string] (where first dimension is the error ranking which is an integer and second dimension is the error code which is a string), int err_score_arr [int][string] (where first dimension is the error ranking which is an integer and second dimension is the error code which is a string), and int err_count_arr [int][string] (where first dimension is the error ranking which is an integer and second dimension is the error code which is a string).

The encapsulated error signature generating module 206 iteratively generates in real-time, an encapsulated error signature based on each of the error ranking, the error code, and an error count associated with the error code derived from one or more of the plurality of arrays. To generate the encapsulated error signature, the encapsulated error signature generating module 206 creates a plurality of error clusters in the encapsulated error signature. Each error cluster includes at least one error code with the same error ranking. Each of the at least one error code is appended with the associated error count. In some embodiments, the encapsulated error signature generating device 202 may be integrated with a testbench component in order to generate encapsulated error signature and consolidated error score for a functional simulation in real-time. In an embodiment, the encapsulated error signature generating module 206 indexes into the "err_seen_arr" array using the error ranking and error code and sets the corresponding array element to 1. Further, the encapsulated error signature generating module 206 goes through elements of the "err_seen_arr" array. Further, for each of the elements with a value of 1, the encapsulated error signature generating module 206 uses the error ranking and the error code corresponding to the element for constructing the encapsulated error signature. Further, the encapsulated error signature generating module 206 sends the encapsulated error signature to the array updating module 204.

The consolidated error score determining module 208 determines a consolidated error score based on the error descriptor notification message 218. The consolidated error score is determined based on summation of error scores in the error descriptor notification message 218. In an embodiment, the consolidated error score determining module 208 indexes into the "err_score_arr" array using the error ranking and the error code from the error descriptor notification message 218. Further, the consolidated error score determining module 208 adds the error score received to corresponding element value. Further, the consolidated error score determining module 208 goes through the "err_seen_arr" elements and for each of the elements with a value of 1, the consolidated error score determining module 208 indexes into the "err_score_arr" array using the error ranking and the error code corresponding to each of the elements to obtain the corresponding error score. Further, the consolidated error score determining module 208 adds the error scores obtained to determine the consolidated error score. Further, the consolidated error score determining module 208 sends the consolidated error score to the array updating module 204.

The error counting module 210 determines the number of different errors in the error descriptor notification message 218 based on an updated one of the plurality of arrays. It may be noted that the encapsulated error signature generating device 202 may receive multiple error descriptor notification messages for a single error increment or flagging in Scoreboard, Checker, or any part of the testbench. For example, when a packet has an incorrect header and a corrupted payload, the Scoreboard or Checker may usually increment the corresponding error count by one. However, the encapsulated error signature generating device 202 may receive one error descriptor notification message for the incorrect header and another error descriptor notification message for the corrupted payload. In an embodiment, the error counting module 210 indexes into the "err_count_arr" array using the error ranking and the error code from the error descriptor notification message 218. Further, the error counting module 210 increments corresponding element value by 1. Further, the error counting module 210 goes through each of elements in the "err_seen_arr" array and counts the number of elements that have a value of 1 to obtain the number of different errors observed. Further, the error counting module 210 sends the number of different errors in the error descriptor notification message 218 to the array updating module 204.

The error message array generating module 214 generates an error message array (for example, a look-up table) comprising a mapping of each error code in the encapsulated error signature to an associated error message. In an embodiment, the error message array generating module 214 indexes into the "err_msg_arr" array using the error ranking and the error code from the error descriptor notification message 218 and stores error message received. Further, the error message array generating module 214 generates an error code look-up table for error codes by listing each of error codes corresponding to an associated error message stored in the "err_msg_arr" array. Further, the error message array generating module 214 sends the error message array to the array updating module 204

The first error code determining module 212 determines a first error code based on error code in the error descriptor notification message 218 when the error descriptor notification message 218 is a first error descriptor notification message received from the simulation. The first error code determining module 212 saves the error code from the error descriptor notification message 218 in the string variable "first_error_code". Further, the first error code determining module 212 sends the first error code to the array updating module 204.

Further, the encapsulated error signature log generating module 216 receives each of the updated plurality of arrays from the array updating module 204. The encapsulated error signature log generating module 216 generates an encapsulated error signature log 220 including the encapsulated error signature, the consolidated error score, the number of different errors, the first error code, and the error message array. The encapsulated error signature log generating module 216 iteratively overwrites the encapsulated error signature, the consolidated error score, the number of different errors observed, and the error message array in the encapsulated error signature log 220 in real-time when a new error descriptor notification message is received during a simulation. When the simulation ends, the encapsulated error signature present in the encapsulated error signature log 220 is a final encapsulated error signature for the simulation (only in case of a failure).

A script (using Perl or any other scripting language) that is capable of parsing the encapsulated error signatures and consolidated error scores in multiple encapsulated error signature logs from different simulations and performing one or more of the following tasks may be used for failures triaging or bucketization:

a. Grouping failures based on FATAL errors (high severity/priority errors) in such failures' encapsulated error signatures;

b. Categorizing the failures based on error rankings from encapsulated error signatures by creating failure buckets for different error rankings available and adding each failed simulation to the respective bucket based on the highest-ranking error seen in such failed simulation (when errors of multiple rankings are present in a simulation, the highest-ranking error(s) determine the ranking bucket that may be assigned to the failed simulation).

c. For each error ranking from encapsulated error signatures, sorting the failed simulations in the respective bucket based on consolidated error scores of such failed simulations (for example, a failed simulation with the largest consolidated error score in an error ranking bucket may be placed at the top of the list).

d. Grouping simulation failures with matching encapsulated error signatures by creating a group bucket per encapsulated error signature that multiple failed simulations share and adding the corresponding failed simulations to the bucket to help the user understand and quickly resolve similar failures.

e. Grouping simulation failures with matching first error observed to help the user identify simulation failures with a matching potential root-cause.

Further, when a need to look up a past simulation error or failure may arise, the encapsulated error signature or consolidated error score generated by the encapsulated error signature generating device 202 for a failed simulation from previous tests may be used as a quick reference and reduce the need to go through respective simulation logs to save time.

It should be noted that all such aforementioned modules 204-216 may be represented as a single module or a combination of different modules. Further, as will be appreciated by those skilled in the art, each of the modules 204-216 may reside, in whole or in parts, on one device or multiple devices in communication with each other. In some embodiments, each of the modules 204-216 may be implemented as dedicated hardware circuit comprising custom application-specific integrated circuit (ASIC) or gate arrays, off-the-shelf semiconductors such as logic chips, transistors, or other discrete components. Each of the modules 204-216 may also be implemented in a programmable hardware device such as a field programmable gate array (FPGA), programmable array logic, programmable logic device, and so forth. Alternatively, each of the modules 204-216 may be implemented in software for execution by various types of processors. An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for generating an encapsulated error signature during functional simulation. For example, the exemplary test environment 100 and the associated error signature encapsulator 102 may generate an encapsulated error signature during functional simulation by the processes discussed herein. In particular, as will be appreciated by those of ordinary skill in the art, control logic and/or automated routines for performing the techniques and steps described herein may be implemented by the test environment 100 and the error signature encapsulator 102 either by hardware, software, or combinations of hardware and software. For example, suitable code may be accessed and executed by the one or more processors on the test environment 100 to perform some or all of the techniques described herein. Similarly, application specific integrated circuits (ASICs) configured to perform some or all of the processes described herein may be included in the one or more processors on the test environment 100.

Figure 3:
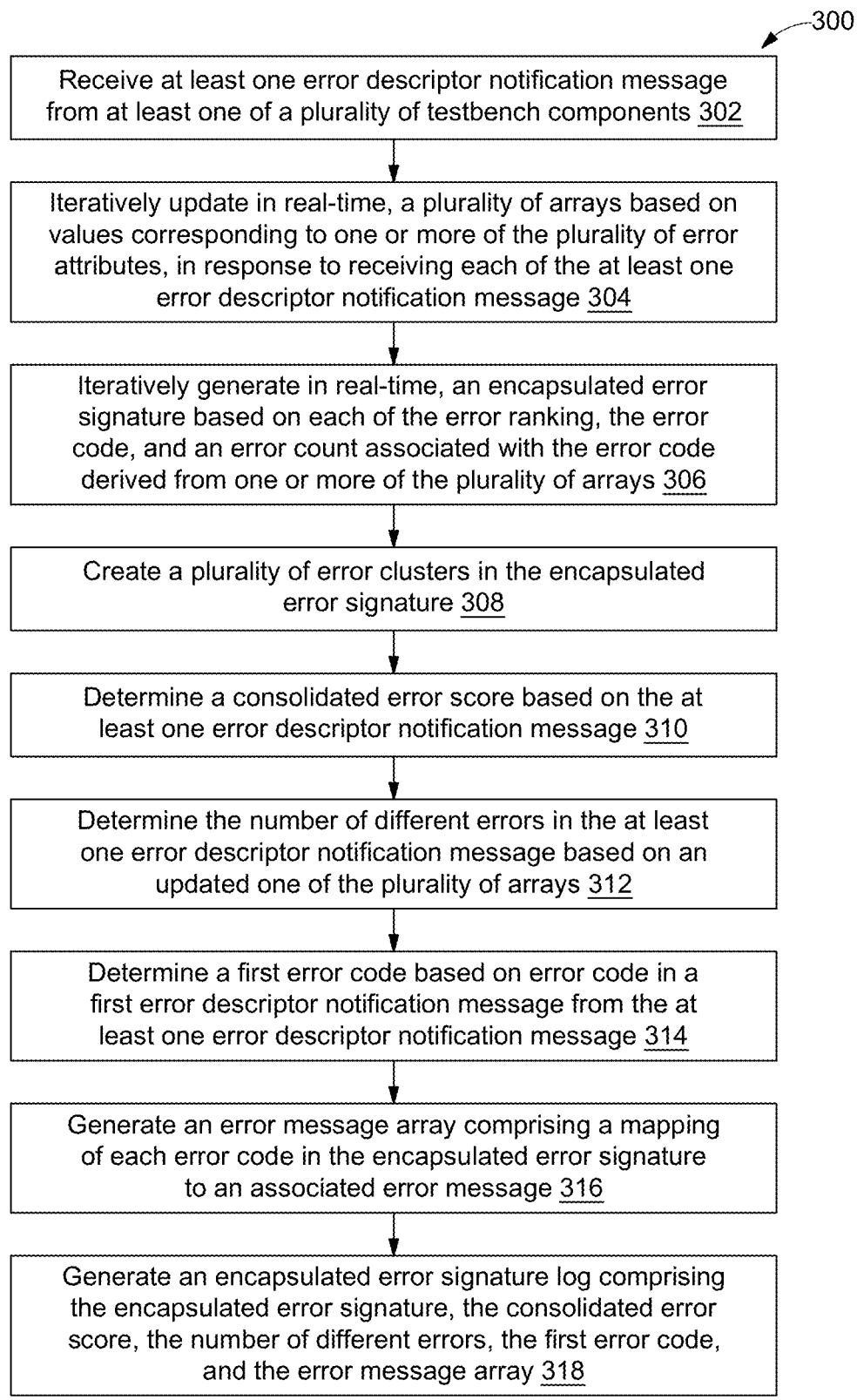
FIG. 3 illustrates a flow diagram of an exemplary process for generating an encapsulated error signature during functional simulation, in accordance with some embodiments.

Referring now to FIG. 3, an exemplary process 300 for generating an encapsulated error signature during functional simulation is depicted via a flowchart, in accordance with some embodiments. In an embodiment, the process 300 may be implemented by the error signature encapsulator 102 of the test environment 100. The process 300 includes receiving, by the array updating module 204, at least one error descriptor notification message (for example, the error descriptor notification message 218) from at least one of a plurality of testbench components, at step 302. Each of the at least one error descriptor notification message includes values corresponding to a plurality of error attributes comprising an error ranking, an error code, an error message, and an error score.

Further, the process 300 includes iteratively updating, by the array updating module 204, in real-time, a plurality of arrays based on values corresponding to one or more of the plurality of error attributes, in response to receiving each of the at least one error descriptor notification message, at step 304. Further, the process 300 includes iteratively generating, by the encapsulated error signature generating module 206, in real-time, an encapsulated error signature based on each of the error ranking, the error code, and an error count associated with the error code derived from one or more of the plurality of arrays, at step 306. Generating the encapsulated error signature by the encapsulated error signature generating module 206 includes creating a plurality of error clusters in the encapsulated error signature, at step 308. Each error cluster includes at least one error code with the same error ranking. Each of the at least one error code is appended with the associated error count.

Further, the process 300 includes determining, by the consolidated error score determining module 208, a consolidated error score based on the at least one error descriptor notification message, at step 310. The consolidated error score is determined based on summation of error scores in each of the at least one error descriptor notification message. Further, the process 300 includes determining, by the error counting module 210, the number of different errors in the at least one error descriptor notification message based on an updated one of the plurality of arrays, at step 312. Further, the process 300 includes determining, by first error code determining module 212, a first error code based on error code in a first error descriptor notification message from the at least one error descriptor notification message, at step 314.

Further, the process 300 includes generating, by the error message array generating module 214, an error message array including a mapping of each error code in the encapsulated error signature to an associated error message, at step 316. Further, the process 300 includes generating, by the encapsulated error signature log generating module 216, an encapsulated error signature log including the encapsulated error signature, the consolidated error score, the number of different errors, the first error code, and the error message array, at step 318.

Figure 4:
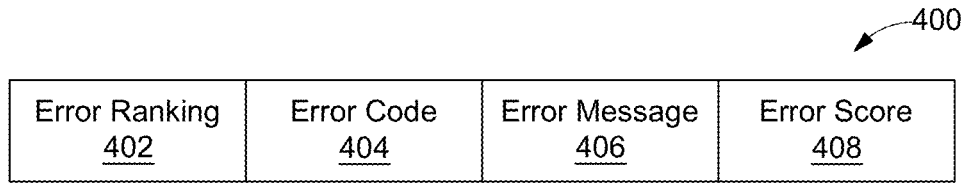
FIG. 4 illustrates an exemplary error descriptor notification message, in accordance with some embodiments.

Referring now to FIG. 4, an exemplary error descriptor notification message 400 is illustrated, in accordance with some embodiments. The error descriptor notification message 400 includes an error ranking 402, an error code 404, an error message 406, and an error score 408. The error ranking 402 represents a ranking with which the error may be handled by the user. The error ranking 402 may be an integer (1 may be the highest ranking/priority (for example: FATAL error), 2 may be the second highest ranking/priority, 3 may be the third highest ranking/priority, and so on).

Further, the error code 404 represents the error using a very short text and may be a string. Further, the error message 406 is a short description of the error and may be a string. Further, the error score 408 is a score/weightage given for the error within an error ranking group and may be an integer.

Figure 5:
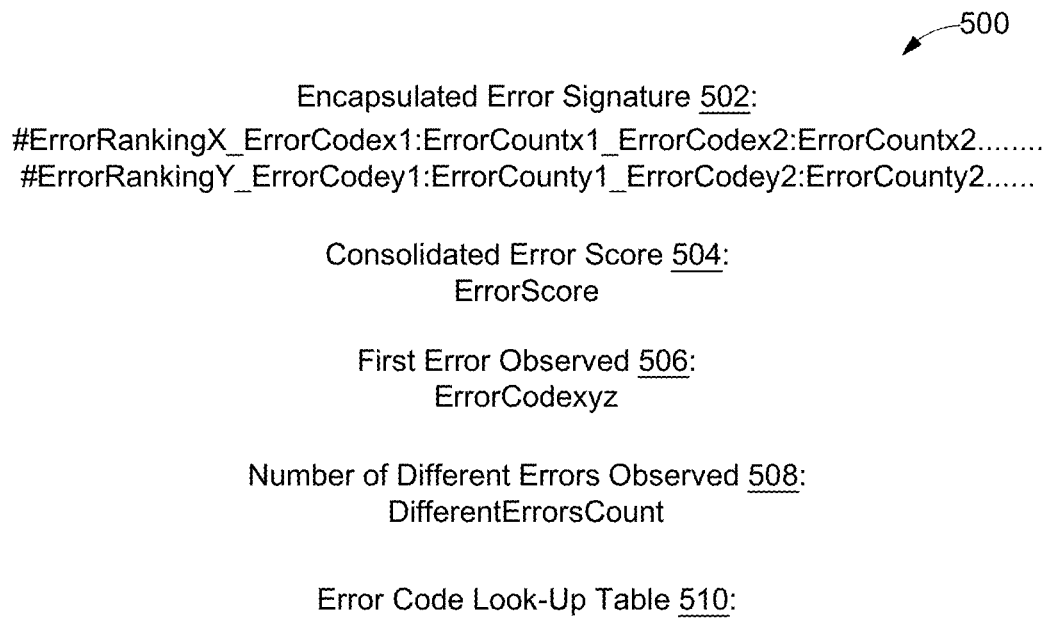
FIG. 5 illustrates an exemplary encapsulated error signature log, in accordance with an embodiment.

Referring now to FIG. 5, an exemplary encapsulated error signature log 500 is illustrated, in accordance with an embodiment. The encapsulated error signature log 500 includes error signature parameters corresponding to an error descriptor notification message. The encapsulated error signature log 500 includes an encapsulated error signature 502, a consolidated error score 504, first error observed 506, number of different errors observed 508, and an error code look-up table 510.

The encapsulated error signature 502 includes error codes (for example, 'ErrorCodex1' and 'ErrorCodex2' or 'ErrorCodey1' and 'ErrorCodey2') with error rankings (for example, "X" (ErrorRankingX) for 'ErrorCodex1' and 'ErrorCodex2', and "Y" (ErrorRankingY) for 'ErrorCodey1' and 'ErrorCodey2'). In some embodiments, the error codes used may be as short as possible. Additionally, the encapsulated error signature 502 includes the error counts (for example, 'ErrorCountx1' and 'ErrorCountx2' for 'ErrorCodex1' and 'ErrorCodex2', respectively (for ErrorRankingX), and 'ErrorCounty1' and 'ErrorCounty2' for 'ErrorCodey1' and 'ErrorCodey2', respectively (for ErrorRankingY)).

By way of an example, the consolidated error score 504 may be 'ErrorScore', the first error observed 506 may be 'ErrorCodexyz', and the number of different errors observed 508 may be 'DifferentErrorsCount'. The error code look-up table 510 includes entries for an error code 512 identified in the error descriptor notification message and a corresponding error message 514. For example, for an error code 512 of 'ErrorCodex1', the corresponding error message 514 may be 'ErrorMessagex1'.

By way of an example, when the encapsulated error signature generating device 202 receives two error descriptor notification messages during a simulation with a single error ranking (ranking: 2), then the encapsulated error signature 502 may be: #2_REGRDMISMATCH:1_OUTPKTHDRMISMATCH:1

By way of another example, when the encapsulated error signature generating device 202 receives three error descriptor notification messages during a simulation of which two error descriptor notification messages are of ranking 1 and one error descriptor notification message is of ranking 2, then the encapsulated error signature may be: #1_REGRDTIMEOUT:1_REGWRTIMEOUT:1_#2_OUT PKTPYLDMISMATCH:1

By way of another example, when the encapsulated error signature generating device 202 receives five error descriptor notification messages during a simulation and one error descriptor notification message is of ranking 1, and remaining four error descriptor notification messages (same error codes) are of ranking 3, then the encapsulated error signature may be: #1_REGRDTIMEOUT:1_#3_COUNTERMISMATCH:4

Referring now to FIG. 6, an exemplary encapsulated error signature log 600 is illustrated, in accordance with an embodiment. The encapsulated error signature log 600 includes error signature parameters corresponding to an error descriptor notification message. The encapsulated error signature log 600 includes an encapsulated error signature 602, a consolidated error score 604, first error observed 606, number of different errors observed 608, and an error code look-up table 610. The error code look-up table 610 includes entries for an error code 612 identified in the error descriptor notification message and a corresponding error message 614.

By way of an example, the encapsulated error signature 602 may be '#1_REGRDTIMEOUT:1_REGWRTIMEOUT:1_#2_OUTPKTPYLDMISMATCH:1', the consolidated error score 604 may be '44', the first error observed 606 may be 'OUTPKTPYLDMISMATCH', the number of different errors observed 608 may be 3, and the error code look-up table 610 may include error codes present in the encapsulated error signature 602, (i.e., 'REGRDTIMEOUT', 'REGWRTIMEOUT', and 'OUTPKTPYLDMISMATCH') and corresponding error messages ('Register Read Transaction Timed Out', 'Register Write Transaction Timed Out', and 'Expected vs. Actual Output Packet Payload Mismatch', respectively).

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
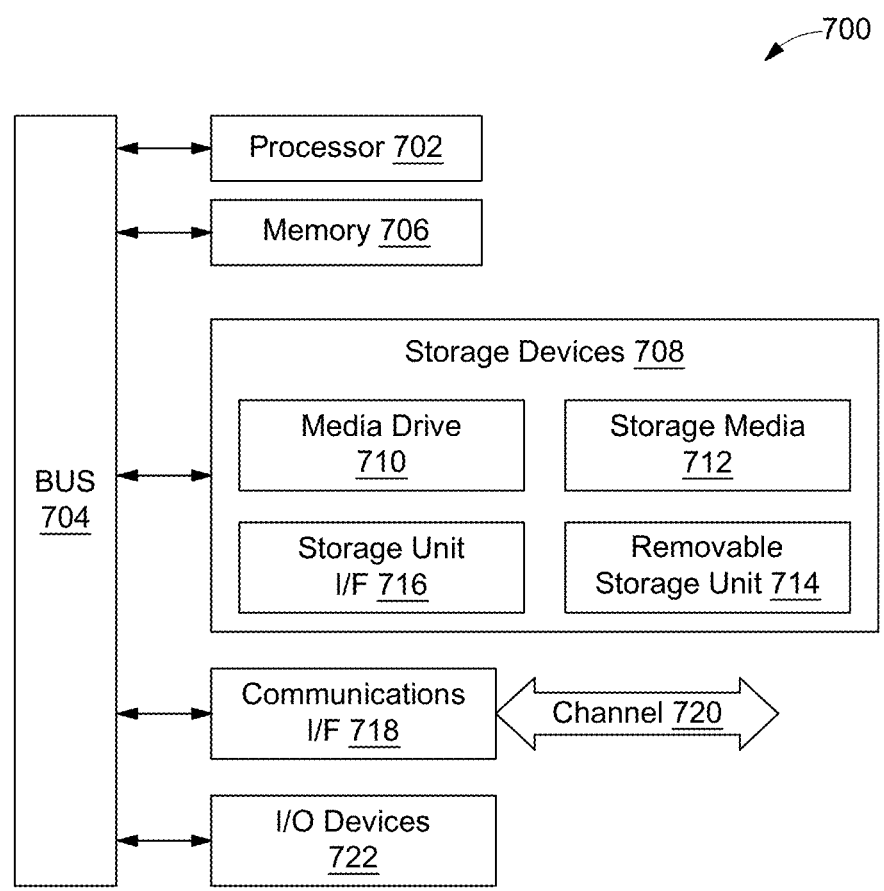
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, an exemplary computing system 700 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 700 may represent, for example, a user device such as a desktop, a laptop, a mobile phone, personal entertainment device, DVR, and so on, or any other type of special or general-purpose computing device as may be desirable or appropriate for a given application or environment. The computing system 700 may include one or more processors, such as a processor 702 that may be implemented using a general or special purpose processing engine such as, for example, a microprocessor, microcontroller or other control logic. In this example, the processor 702 is connected to a bus 704 or other communication medium. In some embodiments, the processor 702 may be an Artificial Intelligence (AI) processor, which may be implemented as a Tensor Processing Unit (TPU), or a graphical processor unit, or a custom programmable solution Field-Programmable Gate Array (FPGA).

The computing system 700 may also include a memory 706 (main memory), for example, Random Access Memory (RAM) or other dynamic memory, for storing information and instructions to be executed by the processor 702. The memory 706 also may be used for storing temporary variables or other intermediate information during execution of instructions to be executed by the processor 702. The computing system 700 may likewise include a read only memory ("ROM") or other static storage device coupled to bus 704 for storing static information and instructions for the processor 702.

The computing system 700 may also include a storage devices 708, which may include, for example, a media drive 710 and a removable storage interface. The media drive 710 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 712 may include, for example, a hard disk, magnetic tape, flash drive, or other fixed or removable medium that is read by and written to by the media drive 710. As these examples illustrate, the storage media 712 may include a computer-readable storage medium having stored therein particular computer software or data.

In alternative embodiments, the storage devices 708 may include other similar instrumentalities for allowing computer programs or other instructions or data to be loaded into the computing system 700. Such instrumentalities may include, for example, a removable storage unit 714 and a storage unit interface 716, such as a program cartridge and cartridge interface, a removable memory (for example, a flash memory or other removable memory module) and memory slot, and other removable storage units and interfaces that allow software and data to be transferred from the removable storage unit 714 to the computing system 700.

The computing system 700 may also include a communications interface 718. The communications interface 718 may be used to allow software and data to be transferred between the computing system 700 and external devices. Examples of the communications interface 718 may include a network interface (such as an Ethernet or other NIC card), a communications port (such as for example, a USB port, a micro USB port), Near field Communication (NFC), etc. Software and data transferred via the communications interface 718 are in the form of signals which may be electronic, electromagnetic, optical, or other signals capable of being received by the communications interface 718. These signals are provided to the communications interface 718 via a channel 720. The channel 720 may carry signals and may be implemented using a wireless medium, wire or cable, fiber optics, or other communications medium. Some examples of the channel 720 may include a phone line, a cellular phone link, an RF link, a Bluetooth link, a network interface, a local or wide area network, and other communications channels.

The computing system 700 may further include Input/Output (I/O) devices 722. Examples may include, but are not limited to a display, keypad, microphone, audio speakers, vibrating motor, LED lights, etc. The I/O devices 722 may receive input from a user and also display an output of the computation performed by the processor 702. In this document, the terms "computer program product" and "computer-readable medium" may be used generally to refer to media such as, for example, the memory 706, the storage devices 708, the removable storage unit 714, or signal(s) on the channel 720. These and other forms of computer-readable media may be involved in providing one or more sequences of one or more instructions to the processor 702 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into the computing system 700 using, for example, the removable storage unit 714, the media drive 710 or the communications interface 718. The control logic (in this example, software instructions or computer program code), when executed by the processor 702, causes the processor 702 to perform the functions of the invention as described herein.

Thus, the disclosed system and method try to overcome the technical problem of generating an encapsulated error signature during pre-silicon functional simulation. The method and system generate an encapsulated error signature during functional simulation. The method and system further generate an encapsulated error signature for each failed simulation. The method and system further generate a consolidated error score for each failed simulation. The method and system further triage or bucketize regression simulation failures based on the encapsulated error signature or consolidated error score mentioned above in each of them. The method and system further group failures based on the first error observed in the failed simulations.

As will be appreciated by those skilled in the art, the techniques described in the various embodiments discussed above are not routine, or conventional, or well understood in the art. The techniques discussed above provide a standard way of triaging or bucketizing regression failures and grouping similar failures automatically. The techniques further generate encapsulated error signature for every simulation failure and a script that parses the encapsulated error signatures from different simulation failures. The techniques further categorize the simulation failures based on corresponding error rankings. The techniques further group similar failures and provide an analysis report to the user. The techniques are further verification methodology-independent (i.e., the method and system may be used in UVM/VMM/OVM/System Verilog Testbenches).

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described system and method for generating an encapsulated error signature during pre-silicon functional simulation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating an encapsulated error signature during functional simulation, the method comprising:
    receiving at least one error descriptor notification message from at least one of a plurality of testbench components in a test environment, wherein each of the at least one error descriptor notification message comprises values corresponding to a plurality of error attributes comprising an error ranking, an error code, an error message, and an error score;
    iteratively updating in real-time, a plurality of arrays based on values corresponding to one or more of the plurality of error attributes, in response to receiving each of the at least one error descriptor notification message; and
    iteratively generating in real-time, an encapsulated error signature based on each of the error ranking, the error code, and an error count associated with the error code derived from one or more of the plurality of arrays, wherein generating the encapsulated error signature comprises:
        creating a plurality of error clusters in the encapsulated error signature, wherein each error cluster comprises at least one error code with the same error ranking, and wherein each of the at least one error code is appended with the associated error count.

2. The method of claim 1, further comprising determining a consolidated error score based on the at least one error descriptor notification message, wherein the consolidated error score is determined based on summation of error scores in each of the at least one error descriptor notification message.

3. The method of claim 2, further comprising determining a number of different errors in the at least one error descriptor notification message based on an updated one of the plurality of arrays.

4. The method of claim 3, further comprising determining a first error code based on error code in a first error descriptor notification message from the at least one error descriptor notification message.

5. The method of claim 4, further comprising generating an error message array comprising a mapping of each error code in the encapsulated error signature to an associated error message.

6. The method of claim 5, further comprises generating an encapsulated error signature log comprising the encapsulated error signature, the consolidated error score, the number of different errors, the first error code, and the error message array.

7. The method of claim 1, wherein each of a subset of arrays from the plurality of arrays comprises a counter, and wherein iteratively updating the plurality of arrays comprises:
    incrementing, at each iteration, the counter for one or more of the set of arrays in response to receiving each of the at least one error descriptor notification message, based on the values corresponding to one or more of the plurality of error attributes.

8. The method of claim 1, wherein, for an error descriptor notification message from the plurality of error descriptor notification messages, the error ranking corresponds to a priority of handling an error, the error code is a predefined text that corresponds to the error, the error message describes the error, and the error score corresponds to a weightage given to the error within an error ranking group.

9. A system for generating an encapsulated error signature during functional simulation, the system comprising:
    a processor; and
    a memory communicatively coupled to the processor, wherein the memory stores processor instructions, which when executed by the processor, cause the processor to:
        receive at least one error descriptor notification message from at least one of a plurality of testbench components, wherein each of the at least one error descriptor notification message comprises values corresponding to a plurality of error attributes comprising an error ranking, an error code, an error message, and an error score;
        iteratively update in real-time, a plurality of arrays based on values corresponding to one or more of the plurality of error attributes, in response to receiving each of the at least one error descriptor notification message; and
        iteratively generate in real-time, an encapsulated error signature based on each of the error ranking, the error code, and an error count associated with the error code derived from one or more of the plurality of arrays, wherein generating the encapsulated error signature comprises:
            creating a plurality of error clusters in the encapsulated error signature, wherein each error cluster comprises at least one error code with the same error ranking, and wherein each of the at least one error code is appended with the associated error count.

10. The system of claim 9, wherein the processor instructions, on execution, further cause the processor to determine a consolidated error score based on the at least one error descriptor notification message, wherein the consolidated error score is determined based on summation of error scores in each of the at least one error descriptor notification message.

11. The system of claim 10, wherein the processor instructions, on execution, further cause the processor to determine a number of different errors in the at least one error descriptor notification message based on an updated one of the plurality of arrays.

12. The system of claim 11, wherein the processor instructions, on execution, further cause the processor to determine a first error code based on error code in a first error descriptor notification message from the at least one error descriptor notification message.

13. The system of claim 12, wherein the processor instructions, on execution, further cause the processor to generate an error message array comprising a mapping of each error code in the encapsulated error signature to an associated error message.

14. The system of claim 13, wherein the processor instructions, on execution, further cause the processor to generate an encapsulated error signature log comprising the encapsulated error signature, the consolidated error score, the number of different errors, the first error code, and the error message array.

15. The system of claim 9, wherein each of a subset of arrays from the plurality of arrays comprises a counter, and wherein to iteratively update the plurality of arrays, the processor instructions, on execution, cause the processor to:
increment, at each iteration, the counter for one or more of the set of arrays in response to receiving each of the at least one error descriptor notification message, based on the values corresponding to one or more of the plurality of error attributes.

16. The system of claim 9, wherein, for an error descriptor notification message from the plurality of error descriptor notification messages, the error ranking corresponds to a priority of handling an error, the error code is a predefined text that corresponds to the error, the error message describes the error, and the error score corresponds to a weightage given to the error within an error ranking group.

17. An error signature encapsulator for generating an encapsulated error signature during functional simulation, the error signature encapsulator configured for:
receiving at least one error descriptor notification message from at least one of a plurality of testbench components, wherein each of the at least one error descriptor notification message comprises values corresponding to a plurality of error attributes comprising an error ranking, an error code, an error message, and an error score;
iteratively updating in real-time, a plurality of arrays based on values corresponding to one or more of the plurality of error attributes, in response to receiving each of the at least one error descriptor notification message; and
iteratively generating in real-time, an encapsulated error signature based on each of the error ranking, the error code, and an error count associated with the error code derived from one or more of the plurality of arrays, wherein generating the encapsulated error signature comprises:
creating a plurality of error clusters in the encapsulated error signature, wherein each error cluster comprises at least one error code with the same error ranking, and wherein each of the at least one error code is appended with the associated error count.

18. The error signature encapsulator of claim 17, further configured for determining a consolidated error score based on the at least one error descriptor notification message, wherein the consolidated error score is determined based on summation of error scores in each of the at least one error descriptor notification message.

19. The error signature encapsulator of claim 18, further configured for determining a number of different errors in the at least one error descriptor notification message based on an updated one of the plurality of arrays.

20. The error signature encapsulator of claim 19, further configured for determining a first error code based on error code in a first error descriptor notification message from the at least one error descriptor notification message.

* * * * *